US010295017B2

(12) United States Patent
Harms et al.

(10) Patent No.: US 10,295,017 B2
(45) Date of Patent: May 21, 2019

(54) WIRE FASTENING DEVICE

(71) Applicant: X-CEN-TEK GmbH & Co. KG, Wardenburg (DE)

(72) Inventors: Andreas Harms, Ofen (DE); Thomas Busch, Wardenburg (DE)

(73) Assignee: X-CEN-TEK GmbH & Co. KG, Wardenburg (DE)

( * ) Notice: Subject to any disclaimer, the term of this patent is extended or adjusted under 35 U.S.C. 154(b) by 0 days.

(21) Appl. No.: 15/974,823

(22) Filed: May 9, 2018

(65) Prior Publication Data

US 2018/0328448 A1 Nov. 15, 2018

(30) Foreign Application Priority Data

May 9, 2017 (DE) .................. 10 2017 110 015

(51) Int. Cl.
*F16G 11/08* (2006.01)
*F16G 11/14* (2006.01)
*F16G 11/10* (2006.01)

(52) U.S. Cl.
CPC ............ *F16G 11/08* (2013.01); *F16G 11/101* (2013.01); *F16G 11/14* (2013.01)

(58) Field of Classification Search
CPC ......... F16G 11/08; F16G 11/14; F16G 11/101

USPC ........................................................ 174/72 A
See application file for complete search history.

(56) References Cited

U.S. PATENT DOCUMENTS

| 7,252,541 B2* | 8/2007 | Tsubaki | H02G 11/00 |
| | | | 174/72 A |
| 2013/0180777 A1* | 7/2013 | Shibata | H02G 3/02 |
| | | | 174/72 A |

* cited by examiner

*Primary Examiner* — Timothy Thompson
*Assistant Examiner* — Michael F McAllister
(74) *Attorney, Agent, or Firm* — Renner, Otto, Boisselle & Sklar, LLP

(57) ABSTRACT

A wire fastening device, wherein two parallel wire guides, arranged oppositely are provided on the flat wire fastening device on a first and second guide sides, wherein two wire ends can be fixed permanently in the wire fastening device, which wire ends are guided movably in the wire guides against the wire fastening device, wherein for this purpose two flat sections of the wire fastening device can be fixed removably to one another by means of a fastening device provided to that effect, that the wire guides respectively of a wire end are deflected and run substantially parallel and opposite to one another, so that the guiding direction of the wire ends can be substantially reversed in the wire guiding device.

4 Claims, 2 Drawing Sheets

WIRE FASTENING DEVICE

RELATED APPLICATION

This application claims priority of German Patent Application No. DE 10 2017 110 015.6 filed May 9, 2017, which is hereby incorporated herein by reference.

FIELD OF THE INVENTION

The invention relates to a wire fastening device for two wire ends.

BACKGROUND

When fixing locally two ends of the wire to each other, it should be referred to laborious knotting or more expensive accessories such as clips or clamps. A disadvantage of accessories is that they are usually heavy or bulky.

SUMMARY

The invention provides an improved wire fastening device for two wire ends, in which the handling is simplified.

According to the invention a wire fastening device is provided, wherein two parallel wire guides, arranged, on the flat wire fastening device on a first and second guide side, wherein two wire ends can be fixed permanently to the wire fastening device, which two wire ends are guided movably in the wire guides on the wire fastening device, wherein for this purpose two flat sections of the wire fastening device can be fixed removably to one another by means of a fastening device provided to that effect, so that the wire guides of a wire end are deflected respectively and run substantially parallel opposite to one another, so that the guiding direction of the wire ends can be reversed in the wire guiding device.

As a result, a clamping is ensured in a particularly effective manner, without resorting to additional parts. The wire fastening device is held in its open position by the wire guide against the wire ends in a way which is not detrimental to the functionality of the wire ends.

A particularly advantageous and therefore preferred embodiment of the invention provides that the fastening device configured in pairs is composed of two co-operating eyelets through which a fixing device can engage the interval of the eyelets fixed to one another.

An equally preferred embodiment of the invention provides that the wire fastening device is made of a sheet-like flexible material which is sewn and superimposed, wherein the wire guides are formed by seams guided parallel to each other. As a result, the handling is easier in both the fixed and in the open state.

Further advantageous embodiments will become apparent from the other dependent claims or their possible sub-combinations.

BRIEF DESCRIPTION OF THE DRAWINGS

The invention will be depicted below using the drawings. In detail, the diagrammatical illustrations are as follows.

The same reference numerals in the figures designate the same or equivalent elements.

DETAILED DESCRIPTION

Figure 1:
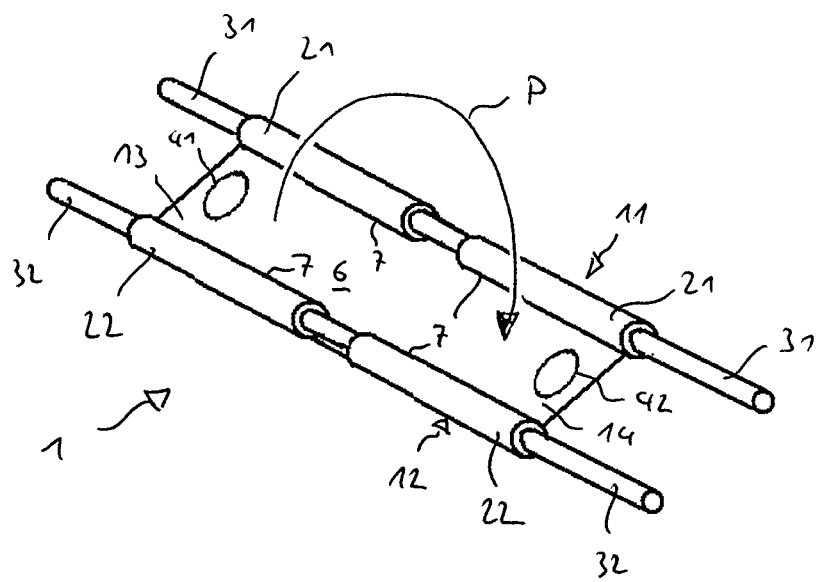
FIG. 1 is a schematic representation of a wire fastening device according to the invention in the open state, FIG. 2 a schematic representation of the wire fastening device of FIG. 1 in the closed state, and FIG. 3 a schematic representation of the wire fastening device of FIG. 2 in the closed state with a fixing device.

FIG. 1 shows a schematic wire fastening device 1 in the open state.

Two parallel wire guides 21, 22, arranged oppositely are provided on the flat wire fastening device 1 on a first and second guide sides 11, 12.

Two wire ends 31, 32 are guided movably through the wire guides 21, 22.

The wire fastening device 1 is made of a sheet-like flexible material 6, which is sewn and superposed, wherein the wire guides 21, 22 are formed by seams 7 guided parallel to each other.

Figure 2:
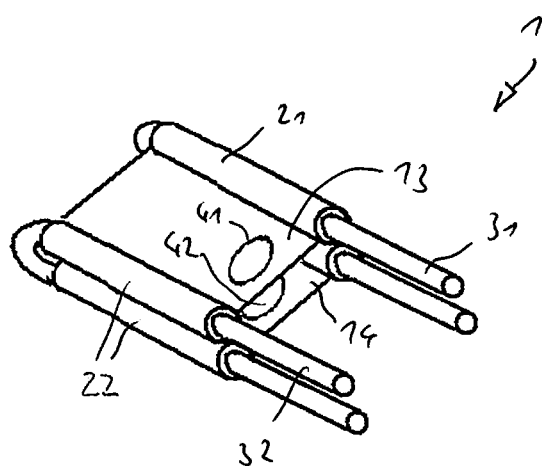
Figure 3:
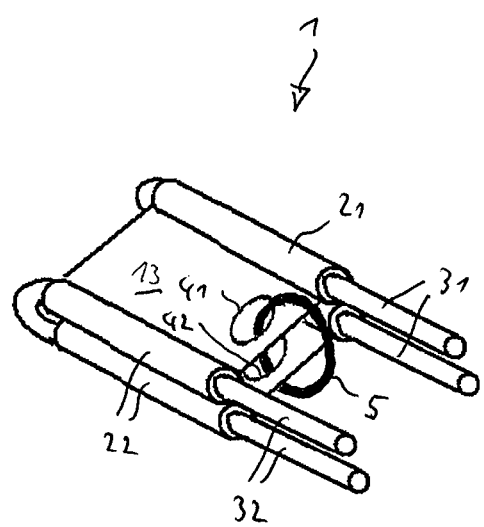

FIGS. 2 and 3 show that the wire ends 31, 32 can be fixed permanently in the wire guides 21, 22.

For this purpose, two flat sections 13, 14 of the wire fastening device 1 are first placed one above the other by kinking the wire ends 31, 32 (see arrow "P" FIG. 2), by means of a fastening device 41, 42 provided to that effect in the form of two co-operating eyelets.

The wire ends 31, 32 are deflected and extend into the wire guide 21, 22, in a substantially opposite and parallel manner so that the guiding direction of the wire ends 31, 32 can be reversed in the wire guiding device. The wire ends can no longer move in the wire guides.

FIG. 3 is shows that the distance of the eyelets to each other is determined by a fixing device 5, in this example an openable ring. A carbine or a bunch can also be used. Consequently, the wire ends can be fixed securely.

LIST OF REFERENCE SIGNS

1 Wire fastening device
11, 12 Guiding side
13, 14 Section
21, 22 Wire guide
31, 32 Wire end
41, 42 Fastening device
5 Fixing device
6 Flexible material
7 Seam

What is claimed is:

1. A wire fastening device comprising:
   two parallel wire guides, arranged oppositely on the flat wire fastening device on a first and second guide sides,
   wherein two wire ends can be fixed permanently in the wire fastening device, which wire ends are guided movably in the wire guides against the wire fastening device,
   wherein for this purpose two flat sections of the wire fastening device can be fixed removably to one another by a fastening device provided to that effect, that the wire guides respectively of a wire end are deflected and run parallel and opposite to one another, so that the guiding direction of the wire ends can be reversed in the wire guiding device.

2. A wire fastening device according to claim 1, wherein the fastening device configured in pairs is composed of two co-operating eyelets, through which a fixing device can engage the interval of the eyelets fixed to one another.

3. A wire fastening device according to claim 2, wherein the wire fastening device is made of a sheet-like flexible material, which is sewn and superimposed, wherein the wire guides are formed by seams guided parallel to each other.

4. A wire fastening device according to claim 1, wherein the wire fastening device is made of a sheet-like flexible material, which is sewn and superimposed, wherein the wire guides are formed by seams guided parallel to each other.

* * * * *